(12) United States Patent
Hirai et al.

(10) Patent No.: US 11,427,141 B2
(45) Date of Patent: Aug. 30, 2022

(54) COMPUTING SYSTEM, SERVER AND ON-VEHICLE DEVICE

(71) Applicant: HITACHI AUTOMOTIVE SYSTEMS, LTD., Hitachinaka (JP)

(72) Inventors: Riu Hirai, Tokyo (JP); Goichi Ono, Tokyo (JP); Taisuke Ueta, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 245 days.

(21) Appl. No.: 16/771,032

(22) PCT Filed: Dec. 5, 2018

(86) PCT No.: PCT/JP2018/044723
§ 371 (c)(1),
(2) Date: Jun. 9, 2020

(87) PCT Pub. No.: WO2019/116985
PCT Pub. Date: Jun. 20, 2019

(65) Prior Publication Data
US 2021/0170962 A1 Jun. 10, 2021

(30) Foreign Application Priority Data
Dec. 13, 2017 (JP) .............................. JP2017-238805

(51) Int. Cl.
*B60R 16/023* (2006.01)
*H04W 4/44* (2018.01)
(Continued)

(52) U.S. Cl.
CPC ........... *B60R 16/0232* (2013.01); *G06N 3/04* (2013.01); *G06N 3/08* (2013.01); *G06V 20/56* (2022.01); *G07C 5/008* (2013.01); *H04W 4/44* (2018.02)

(58) Field of Classification Search
CPC .......... G06N 3/08; G06N 3/04; G06N 3/0454; H04W 4/44; G06V 10/82; B60R 16/0232;
(Continued)

(56) References Cited

U.S. PATENT DOCUMENTS

2016/0078339 A1  3/2016  Li et al.
2016/0328644 A1  11/2016  Lin et al.
(Continued)

FOREIGN PATENT DOCUMENTS

JP    2017-531255 A    10/2017

OTHER PUBLICATIONS

Cococcioni et al.; Exploiting Posit Arithmetic for Deep Neural Networks in Autonomous Driving Applications; 2018 Intl. Conf. of Electrical and Electronic Technologies for Automotive; Jul. 9-11, 2018; pp. 1-6 (Year: 2018).*
(Continued)

*Primary Examiner* — Michael J Zanelli
(74) *Attorney, Agent, or Firm* — Volpe Koenig

(57) ABSTRACT

A computing system includes a server, and an on-vehicle device mounted on a vehicle. The server includes: a server storage part containing a learned model; a simplification part which generates a contraction information for determination of calculation precision by using the learned model and an object of inference; and a server communication part for transmitting the contraction information to the on-vehicle device. The on-vehicle device includes: a signal input part to which an output signal from a sensor mounted on the vehicle is inputted; an on-vehicle communication part for receiving the contraction information; an inference part for making an inference on the output signal and a reconfigurable logic circuit; and a reconfiguration part for configuring the inference part in the logic circuit based on the contraction information.

8 Claims, 8 Drawing Sheets

(51) Int. Cl.
*G06N 3/04* (2006.01)
*G06N 3/08* (2006.01)
*G07C 5/00* (2006.01)
*G06V 20/56* (2022.01)

(58) Field of Classification Search
CPC .... B60R 16/023; G07C 5/008; G07C 5/0866; G06K 9/6273; G06F 8/60; G08G 1/09
See application file for complete search history.

(56) References Cited

U.S. PATENT DOCUMENTS

2017/0323197 A1   11/2017  Gibson et al.
2019/0130255 A1*  5/2019  Yim ........................ G06N 3/08

OTHER PUBLICATIONS

Philipp Gysel, Mohammad Motamedi, and Soheil Ghiasi., "Hardware-Oriented Approximation of Convolutional Neural Networks", arXiv: 1604.03168, 2016. [Searched on Nov. 16, 2017] Internet <URL:https://arxiv.org/pdf/1604.03168v3.pdf>.
International Search Report and English Translation, PCT/JP2018/044723 dated Mar. 12, 2019, 4 pgs.
Ishii, Jun et al. "DNN having a variable data bit width and its accelerator architecture," IEICE technical report, Jul. 19, 2017, vol. 117, No. 154, pp. 83-90 (Cited as Category "Y", called "A study of DNN with variable data bit width and its accelerator architecture" reference in the International Search Report dated Mar. 12, 2019 for PCT International Application No. PCT/JP2018/044723, which was previously disclosed with the initial application filing on Jun. 9, 2020).
Suto, Shinichi et al., "Scalable and convertible FPGA DNN accelerator," IEICE technical report, Sep. 18, 2017, vol. 117, No. 221, pp. 47-49 (Cited as Category "A" reference in the International Search Report dated Mar. 12, 2019 for PCT International Application No. PCT/JP2018/044723, which was previously disclosed with the initial application filing on Jun. 9, 2020).

* cited by examiner

FIG. 3

| THRESHOLD VALUE TABLE ||
|---|---|
| HIERARCHICAL LAYER | DECREASE IN PERMISSIBLE PRECISION |
| LAYER 1 | 20% |
| LAYER 2 | 5% |
| . | . |
| . | . |

CONDITIONS TABLE 252

| | HIGH-SPEED RUNNING | | WET WEATHER | | STOPPED | | |
|---|---|---|---|---|---|---|---|
| | EXPONENT PART | MANTISSA PART | EXPONENT PART | MANTISSA PART | EXPONENT PART | MANTISSA PART | |
| LAYER 1 | 4bit | 10bit | 6bit | 16bit | 3bit | 8bit | · |
| LAYER 2 | 4bit | 3bit | 6bit | 20bit | 3bit | 2bit | · |
| · | · | · | · | · | · | · | · |
| · | · | · | · | · | · | · | · |

COMPUTING SYSTEM, SERVER AND ON-VEHICLE DEVICE

TECHNICAL FIELD

The present invention relates to a computing system, server and on-vehicle device.

BACKGROUND ART

In outside recognition utilizing a neural network, results of product sum operation using a model learned on a center side and image information inputted from a sensor part are used. Since a conventional microcomputer for embedded use is low in throughput speed, a rewritable logic circuit as an accelerator is used. However, an on-vehicle logic circuit is known to have a problem of including fewer multipliers and less internal memory. Disclosed in non-patent literature 1 as a countermeasure against this is a method of reducing a circuit size by quantization processing of floating-point type, namely conversion to fixed point using integer type.

CITATION LIST

Non-Patent Literature

Nonpatent Literature 1: Philipp Gysel, Mohammad Motamedi, and Soheil Ghiasi., "HARDWARE-ORIENTED APPROXIMATION OF CONVOLUTIONAL NEURAL NETWORKS", arXiv:1604.03168, 2016. [Searched on Nov. 16, 2017] Internet.

SUMMARY OF INVENTION

Technical Problem

In the inventive method disclosed in the nonpatent literature 1, there may be a case where performance degradation is impermissible.

Solution to Problem

A computing system according to a first aspect of the invention includes a server and an on-vehicle device mounted on a vehicle. The server includes: a server storage part containing a learned model; a simplification part which generates contraction information for determination of calculation precision by using the learned model and an object of inference; and a server communication part for transmitting the contraction information to the on-vehicle device. The on-vehicle device includes: a signal input part to which an output signal from a sensor mounted on the vehicle is inputted; an on-vehicle communication part for receiving the contraction information; an inference part for making an inference on the output signal; a reconfigurable logic circuit; and a reconfiguration part for configuring the inference part in the logic circuit based on the contraction information.

A server according to a second aspect of the invention includes: a storage part containing a learned model; a simplification part which generates a contraction information for determination of calculation precision by using the learned model and an object of inference; and a server communication part for transmitting the contraction information to an on-vehicle device.

An on-vehicle device according to a third aspect of the invention includes: a signal input part which is mounted on a vehicle and to which an output signal from a sensor mounted on the vehicle is inputted; an on-vehicle communication part for receiving a contraction information for determination of calculation precision; an inference part for making an inference on the output signal and a reconfigurable logic circuit; and a reconfiguration part for configuring the inference part in the logic circuit based on the contraction information.

Advantageous Effects of Invention

According to the invention, an occupation area of the logic circuit can be reduced without significantly decreasing the calculation precision.

BRIEF DESCRIPTION OF DRAWINGS

FIG. 3 is a chart showing an example of a threshold value table 155;

FIG. 8 is a chart showing an example of a conditions table 252.

DESCRIPTION OF EMBODIMENTS

First Embodiment

A computing system S according to a first embodiment of the invention is described as below with reference to FIG. 1 to FIG. 4.

Hardware Configuration

Figure 1:
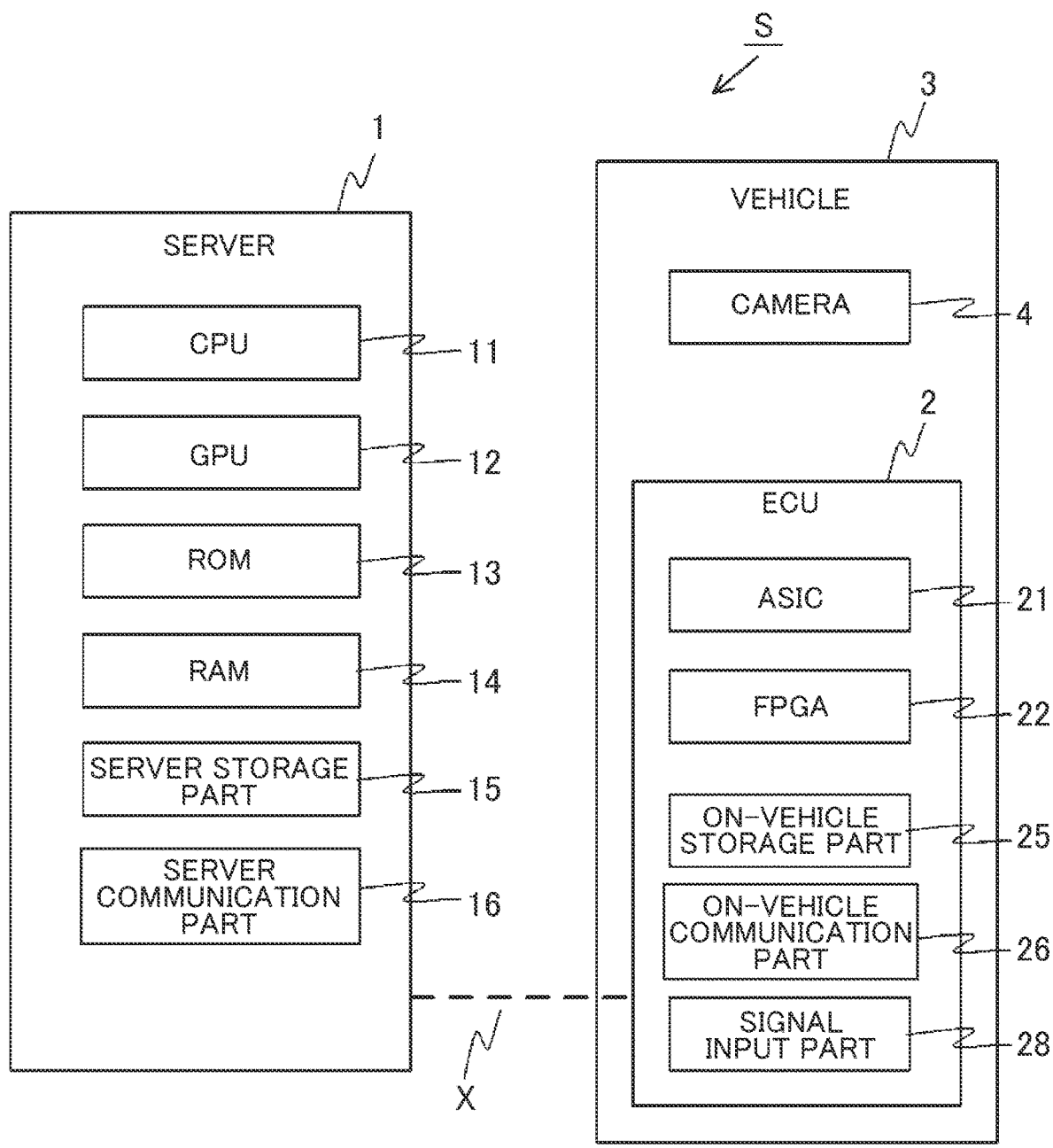
FIG. 1 is a configuration diagram showing a computing system S.

FIG. 1 is a diagram showing a configuration of the computing system S. The computing system S includes a server 1 and an ECU 2. The server 1 and the ECU 2 communicate with each other via a wireless communication network X. The ECU 2 is mounted on a vehicle 3, while the server 1 is disposed externally of the vehicle 3.

The server 1 includes a CPU 11, a GPU 12, a ROM 13, a RAM 14, a server storage part 15, and a server communication part 16. The CPU 11 is a central processing unit. The GPU 12 is a graphic processing unit which is specialized in a particular processing and capable of high-speed calculation. The ROM 13 is a read-only memory area containing programs executed by the CPU 11 and the GPU 12. The RAM 14 is a readable/writable memory area. The server storage part 15 is a nonvolatile memory device such as a hard disk drive. The server communication part 16 implements communication with the ECU 2. The CPU 11 and the GPU 12 implement functions to be described hereinafter by executing programs stored in the ROM 13.

The server 1 has a greater abundance of calculation resources than the ECU 2 and is capable of high-precision calculation. The GPU 12 makes a floating-point type calculation with 32-bit precision, for example. If a numerical value is represented by the floating-point type, the value is composed of a sign part, a mantissa part and an exponent part. The GPU 12, for example, makes a calculation represented by a 1-bit sign part, an 8-bit exponent part and a 23-bit mantissa part. It is noted, however, the GPU 12 may also perform a floating-point type calculation with 64-bit precision or 16-bit precision.

The vehicle 3 includes the ECU 2 and a camera 4. The camera 4 outputs to the ECU 2 a shot image taken by the camera 4. The ECU 2 infers a subject of the shot image and outputs the inference result to another processing unit mounted on the vehicle 3, such as a self-driving unit.

The ECU 2 includes: an ASIC (Application Specific Integrated Circuit) 21 which is an integrated circuit for specific application; an FPGA (Field Programmable Gate Array) 22 which is a reconfigurable integrated circuit; an on-vehicle storage part 25; an on-vehicle communication part 26; and a signal input part 28. The ASIC 21 is a hardware circuit which executes a predetermined processing to be described hereinafter. At each start-up, the FPGA 22 retrieves a configuration information from a predetermined area of the on-vehicle storage part 25 and configures the logic circuit. Hereinafter, the configuration information is also referred to as structure information. The on-vehicle storage part 25 is a rewritable nonvolatile memory such as a flash memory. The on-vehicle communication part 26 communicates with the server 1. The shot image sent from the camera 4 is inputted to the signal input part 28.

Functional Configuration

Figure 2:
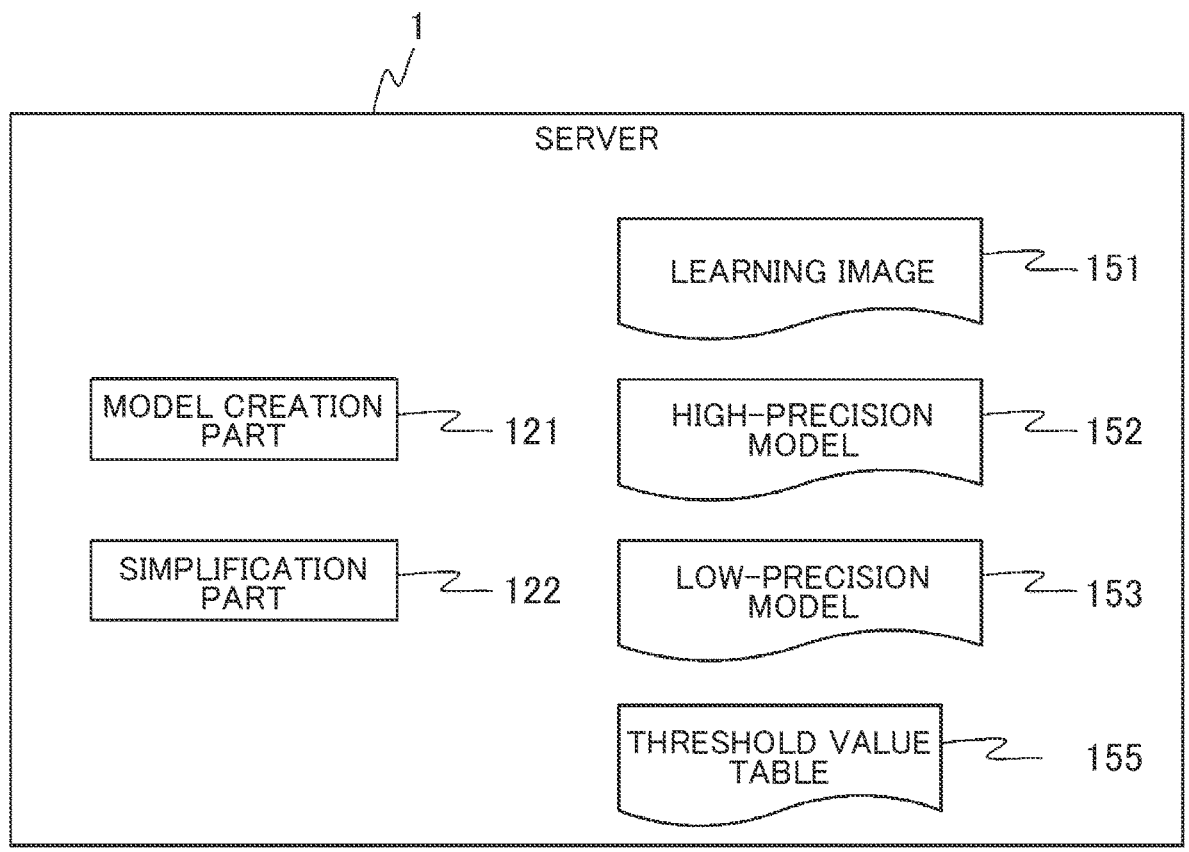
FIG. 2 is a set of functional configuration diagrams of a server 1 and an ECU 2 according to a first embodiment hereof.
Figure 2:
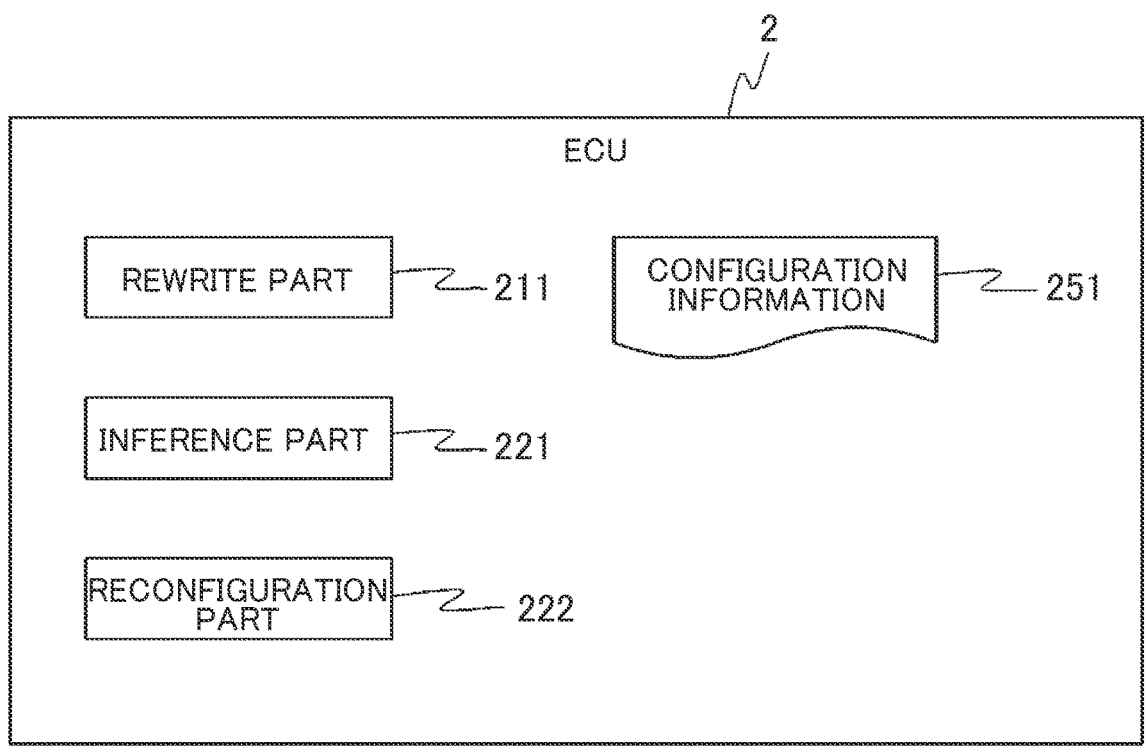

FIG. 2 is a set of functional configuration diagrams of the server 1 and the ECU 2. The server 1 includes a model creation part 121 and a simplification part 122 as functional components thereof. The model creation part 121 is implemented by the CPU 11, while the model creation part 121 and the simplification part 122 are implemented by the GPU 12. It is noted that the model creation part 121 and the simplification part 122 may also be implemented by cooperation between the CPU 11 and the GPU 12. The server storage part 15 contains learning image 151, high-precision model 152, low-precision model 153 and threshold value table 155. The learning image 151 is a collection of plural images. The high-precision model 152 and the low-precision model 153 are learned models created using the learning image 151. Both the high-precision model and the low-precision model have linearity. The learning image 151 is also used as an object of inference for creation of the low-precision model 153.

The high-precision model 152 and the low-precision model 153 are essentially composed of multiple layers including a convolution layer and a BN layer. Each of the layers has one or more parameters. The high-precision model 152 and the low-precision model 153 have the same number of layers but differ from each other in the parameter and the calculation precision. In the high-precision model 152, for example, the parameters of all the layers are expressed with 32-bit precision of the floating-point type and the calculation is also performed with 32-bit precision of the floating-point type. However, the precisions of the parameters and the calculation in the low-precision model 153 are lower than those of the high-precision model 152. It is noted, however, that the precision for the low-precision model 153 is independently defined on a per-layer basis and as for the same layer, a precision of parameter expression and a precision of calculation are the same.

FIG. 3 is a chart showing an example of the threshold value table 155. The threshold value table 155 contains a difference between a permissible precision of the high-precision model 152 and a permissible precision of the low-precision model 153 for each layer of the learned model. Returning to FIG. 2, further description is made.

The model creation part 121 creates the high-precision model 152 as the learned model by using the learning image 151. A known method such as an error back propagation method can be used for the creation of the high-precision model 152. In the error back propagation method, a difference from a correct answer is propagated backward from a layer close to an output layer to an input layer. The simplification part 122 creates the low-precision model 153 by using the high-precision model 152, the learning image 151 and the threshold value table 155. The low-precision model 153 created by the simplification part 122 is transmitted to the ECU 2 by the server communication part 16.

In a case where an inference is made by using the learned model, there is a tendency that inference accuracy increases with increase in the calculation precision and the inference accuracy decreases with decrease in the calculation precision. The calculation precision means, for example, a digit number of a numerical value used in the calculation. If a numerical value is represented by the floating-point type, the numerical value is composed of the sign part, the mantissa part and the exponent part. Specifically, the digit numbers representing the mantissa part and the exponent part or more strictly, the magnitude of the bit number indicates the level of calculation precision. Although a high-precision inference result can be obtained by increasing the precision of calculation, this approach is not desirable. In a case where a computing element is configured in FPGA 22, the higher is the precision of the element, the larger is the area occupied by the element. Furthermore, power consumption is also increased. Therefore, the simplification part 122 creates and sends an optimum low-precision model 153 to the ECU 2.

After the first creation of the low-precision model 153, the simplification part 122 creates the low-precision model 153 in the following cases which include: a case of updating an algorithm for creating the high-precision model 152, a case of changing hardware related to the ECU 2 such as changing the camera 4 to output a shot image of higher resolution; and the like.

The ECU 2 includes a rewrite part 211, an inference part 221, and a reconfiguration part 222 as functional components thereof. The on-vehicle storage part contains structure information 251. When activated, the reconfiguration part 222 retrieves the structure information 251 as the configuration information and carries out configuration to configure the inference part 221 in the FPGA 22. The rewrite part 211 is a hardware circuit of the ASIC 21. The inference part 221 is a logic circuit configured in the FPGA 22. The reconfiguration part 222 is a function previously implemented in the FPGA 22.

When receiving the low-precision model 153 from the server 1, the rewrite part 211 rewrites the structure information 251 by using the received low-precision model 153. As such, next time the FPGA 22 is activated, the rewritten structure information 251 is retrieved so that the received low-precision model 153 is configured as the inference part 221. The inference part 221 is a logic circuit configured in the FPGA 22 and handles the shot image taken by the camera 4 as a processing object. The inference part 221 outputs an inference result to another device mounted on the vehicle 3.

Figure 4:
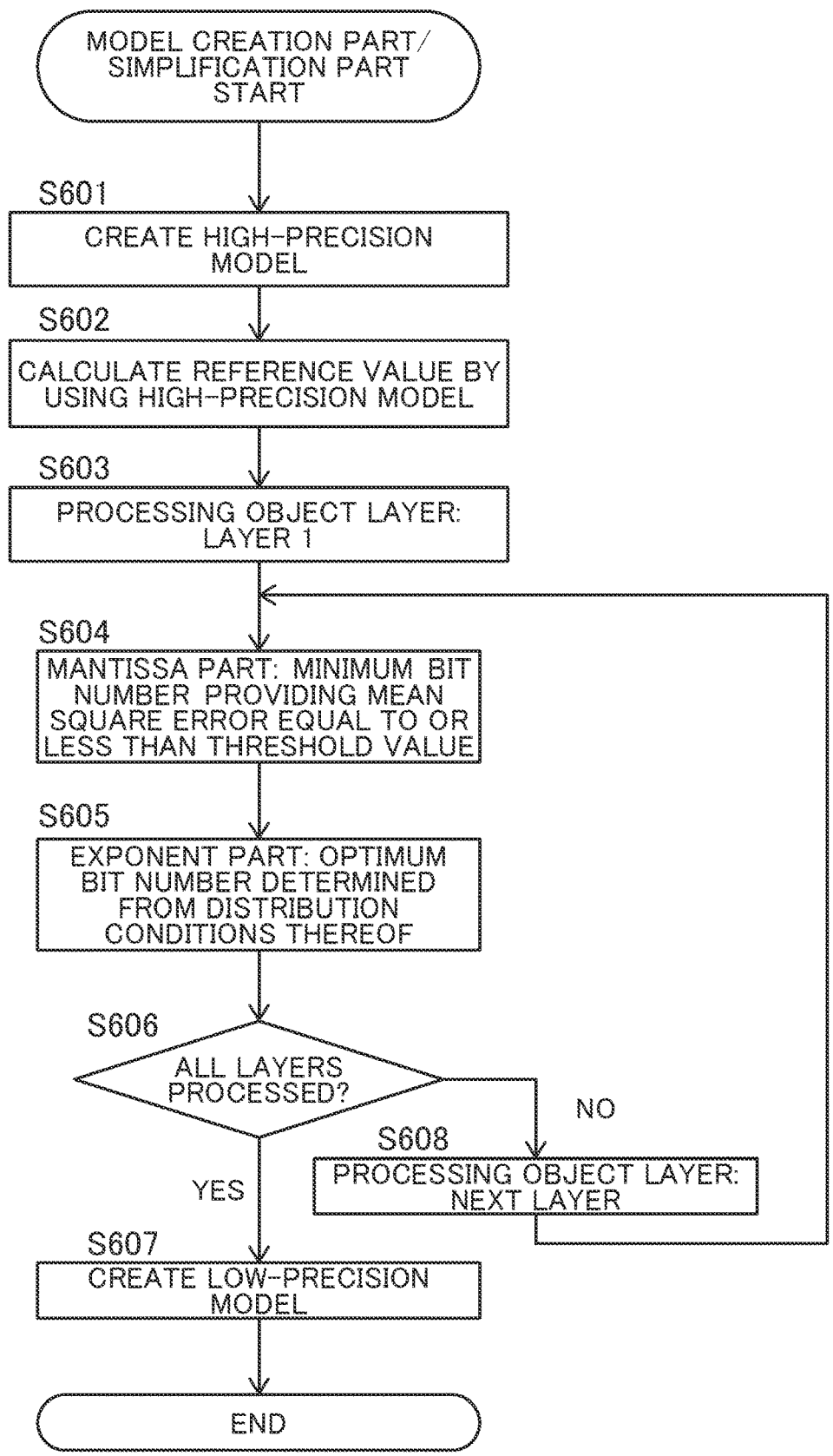
FIG. 4 is a flow chart showing the steps of an operation of a model creation part 121 and a simplification part 122.

FIG. 4 is a flow chart showing the steps of an operation of the model creation part 121 and the simplification part 122. Individual steps described as below are principally executed by the GPU 12. The model creation part 121 creates the high-precision model 152 by using the learning image 151 based on a known method (S601). As described above, all the parameters included in the high-precision model 152 have high precisions such as 32-bit precision. Next, the simplification part 122 makes an inference on the learning image 151 by using the high-precision model 152 created in S601, and temporarily stores the calculation results of the respective layers as reference values (S602). In this calculation, data on the learning image 151 as an object of inference, namely pixel Value thereof is also handled as a value of 32-bit floating-point type.

Next, the simplification part 122 selects a first layer of the high-precision model 152 as a processing object layer (S603) and calculates optimum bit numbers for the mantissa part and the exponent part (S604, S605). Specifically, the simplification part 122 equally lowers the precision of a parameter value of the processing object layer, the precision of a pixel value of the learning image 151 and the precision of the calculation in S604, and determines a minimum bit number providing a minimum square error from the reference value calculated in S602, the minimum square error being equal to or less than the threshold value. It is noted that this threshold value is previously defined in the threshold value table 155. For example, the bit number of the mantissa part is sequentially decreased from 23 by one at a time, and when the minimum square error exceeds the threshold value, the immediately preceding bit number is defined as the optimum bit number. In S605, the simplification part 122 determines an optimum bit number of the exponent part from distribution conditions of exponent parts of numerical values related to the calculation of the processing object layer using the high-precision model 152. For example, the simplification part 122 selects a minimum bit number that covers all the exponents of the numerical values related to the calculation or that covers a predetermined ratio such as about 68% of the exponents providing 1 sigma value.

Subsequently in S606, the simplification part 122 determines whether all the layers have been processed or not. If all the layers have been processed, the simplification part proceeds to S607. If there is a layer yet to be processed, the simplification part proceeds to S608. In S607, the simplification part 122 creates the low-precision model 153 based on the calculation precisions of the individual layers as determined in the previous Steps S604 and S605. This low-precision model 153 is decreased in the calculation precisions and the precisions of the used parameters as compared with the high-precision model 152. In S608, the simplification part 122 sets the processing object layer to the next layer before returning to S604. Such are the operations of the model creation part 121 and the simplification part 122.

According to the above-described first embodiment, the following working effects are obtained.

(1) The computing system S includes the server 1 and the ECU 2 mounted on the vehicle 3. The server 1 includes: the server storage part 15 containing the high-precision model 152; the simplification part 122 for creating the low-precision model 153, the calculation precision of which is determined by using the high-precision model 152 and the learning image 151; and the server communication part 16 for transmitting the low-precision model 153 to the ECU 2. The ECU 2 includes: the signal input part 28 to which the shot image taken by the camera 4 mounted on the vehicle 3 is inputted; the on-vehicle communication part 26 for receiving the low-precision model 153; the inference part 221 for making an inference on the shot image; the reconfigurable FPGA 22; and the rewrite part 211 and the reconfiguration part 222 which create the inference part 221 in the FPGA 22 based on the low-precision model 153. Since the ECU 2 creates the inference part 221 in the FPGA 22 based on the low-precision model 153, the occupation area of the logic circuit can be reduced without significantly decreasing the calculation precision.

(2) The high-precision model 152 and the low-precision model 153 are essentially composed of linear components alone. Accordingly, the influence of the decreased calculation precision on the calculation result appears linearly. This enables the server 1 to decide a suitable calculation precision or decide suitable digit numbers of the mantissa part and the exponent part.

First Modification

According to the above-described first embodiment, the server 1 and an on-vehicle device 2 communicate with each other via a wireless communication network X. However, the low-precision model 153 created by the server 1 may also be transferred offline to the on-vehicle device 2 by using a storage medium rather than the communication network.

Figure 5:
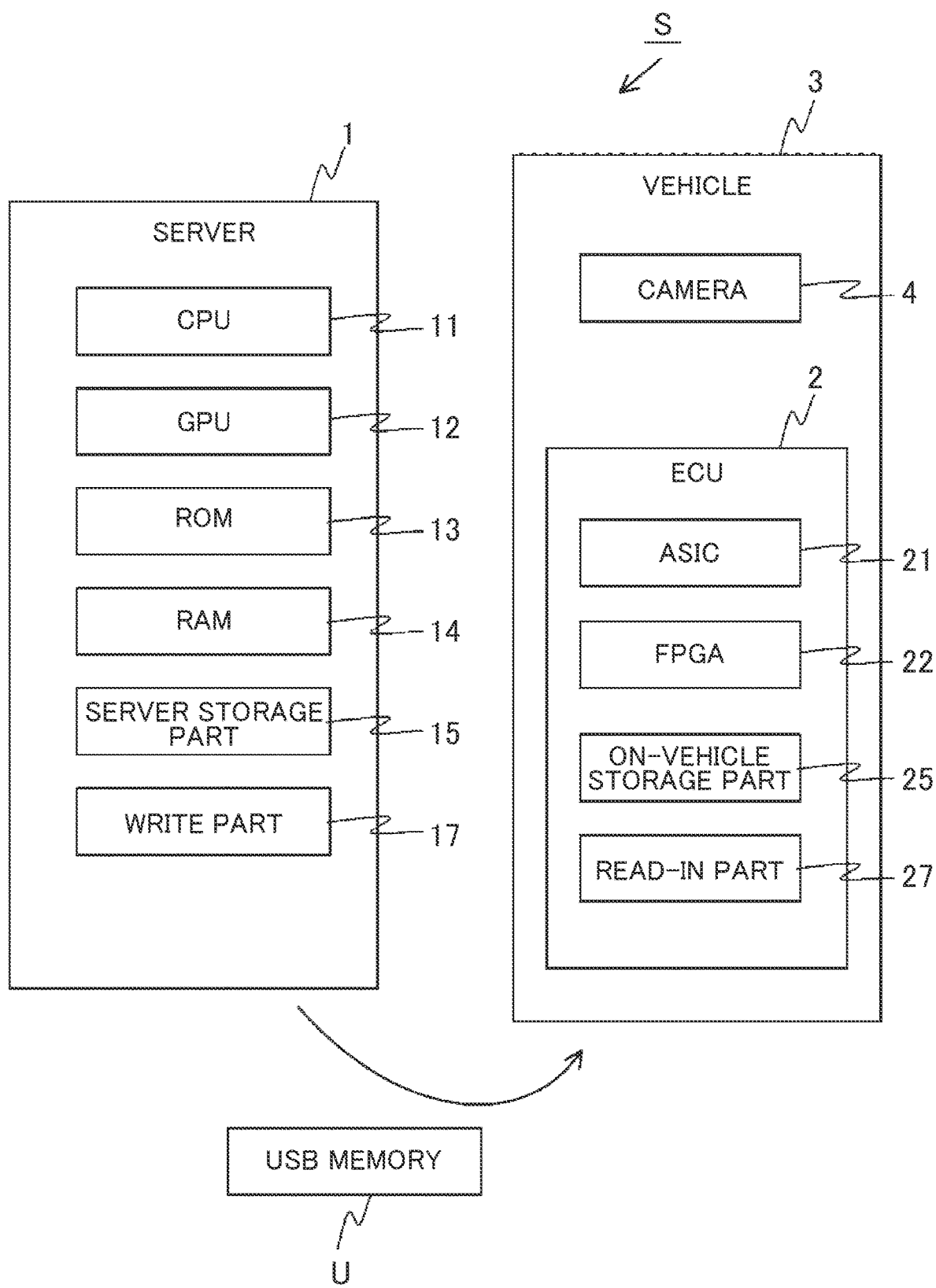
FIG. 5 is a hardware configuration diagram of a computing system S according to a first modification.

FIG. 5 is a hardware configuration diagram of a computing system S according to a first modification. The modification differs from the first embodiment in that the server 1 includes a write part 17 in place of the server communication part 16 and that the ECU 2 includes a read-in part 27 in place of the on-vehicle communication part 26. The server 1 enters the calculated low-precision model 153 into a storage medium such as a USB memory U via the write part 17. A service person of a dealer or a user of the vehicle 3 connects the USB memory U to a read-in part 27 of the ECU 2 so as to allow the ECU 2 to read in the low-precision model 153.

Second Modification

In the above-described first embodiment, the inference part 221 configured in the FPGA 22 of the ECU 2 handles the shot image taken by the camera 4 as the processing object. However, the inference part 221 may also handle as the processing object a variety of information pieces outputted from sensors mounted on the vehicle 3. For example, the inference part may handle two-dimensional or three-dimensional information obtained via a laser range finder as the processing object. Otherwise, three-dimensional time-series information, namely four-dimensional information may be handled as the processing object. In a case where outputs from multiple sensors are handled, the outputs may be handled as a multi-dimensional information of five dimensions or more.

In conjunction with the change in the processing details of the inference part 221, the high-precision model 152 and the low-precision model 153 created by the model creation part 121 of the server 1 also need be recreated. According to the second modification, the application of the invention provides a notable effect of reducing the processing quantity because the higher is the dimension of the information, the larger is the processing quantity.

Third Modification

The ECU 2 may further include a nonlinear inference part having nonlinearity. In this case, the inference part 221 outputs an inference result to the nonlinear inference part, which outputs the inference result to another device mounted on the vehicle 3.

Fourth Modification

The hardware configurations of the server 1 and the ECU 2 are not limited to the above-described configurations. For example, the server 1 need not include the CPU 11 or the GPU 12. The ECU 2 may include a CPU, a ROM and a RAM in place of the ASIC 21.

Second Embodiment

Figure 6:
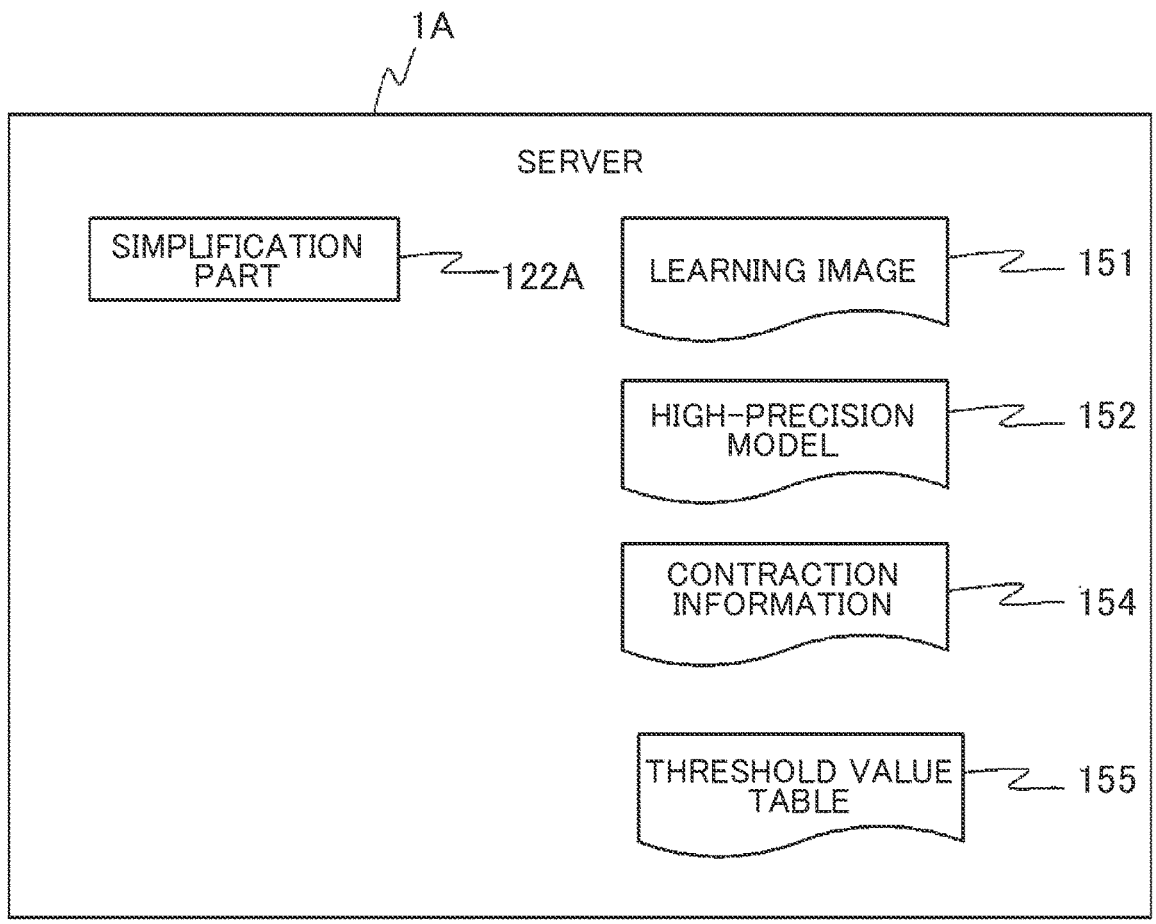
FIG. 6 is a set of functional configuration diagrams of a server 1A and an ECU 2A according to a second embodiment hereof.
Figure 6:
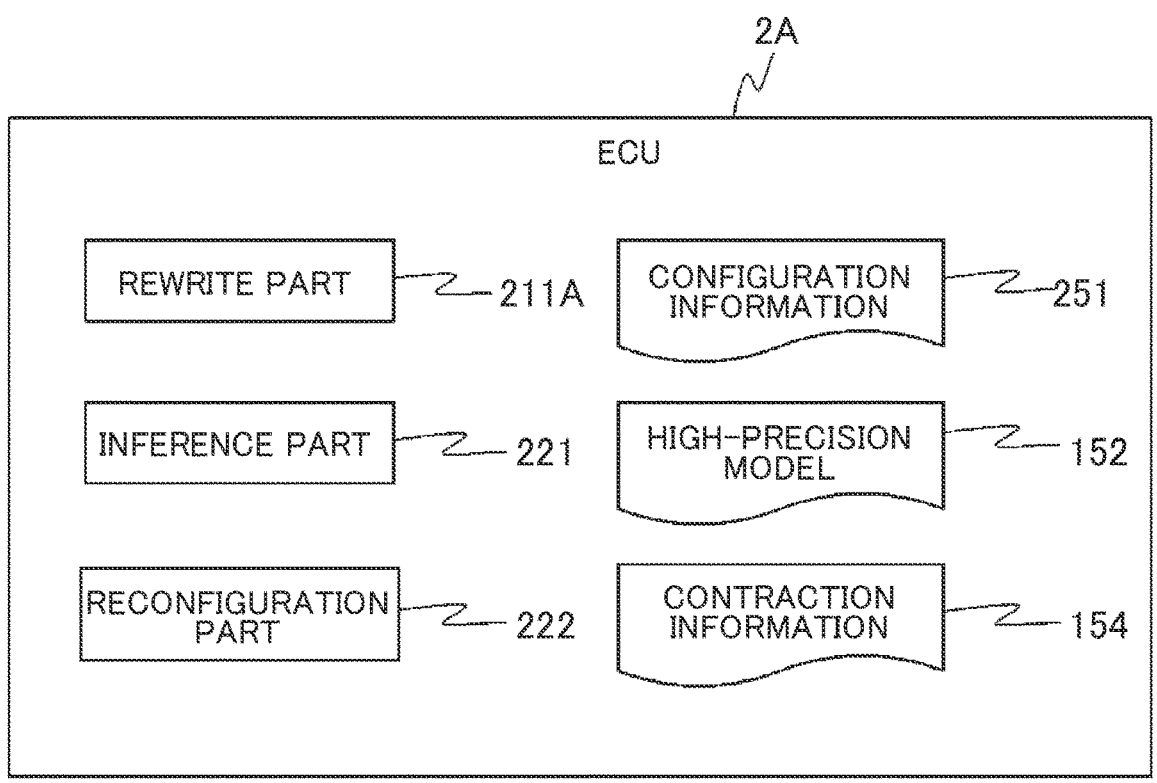
Figure 7:
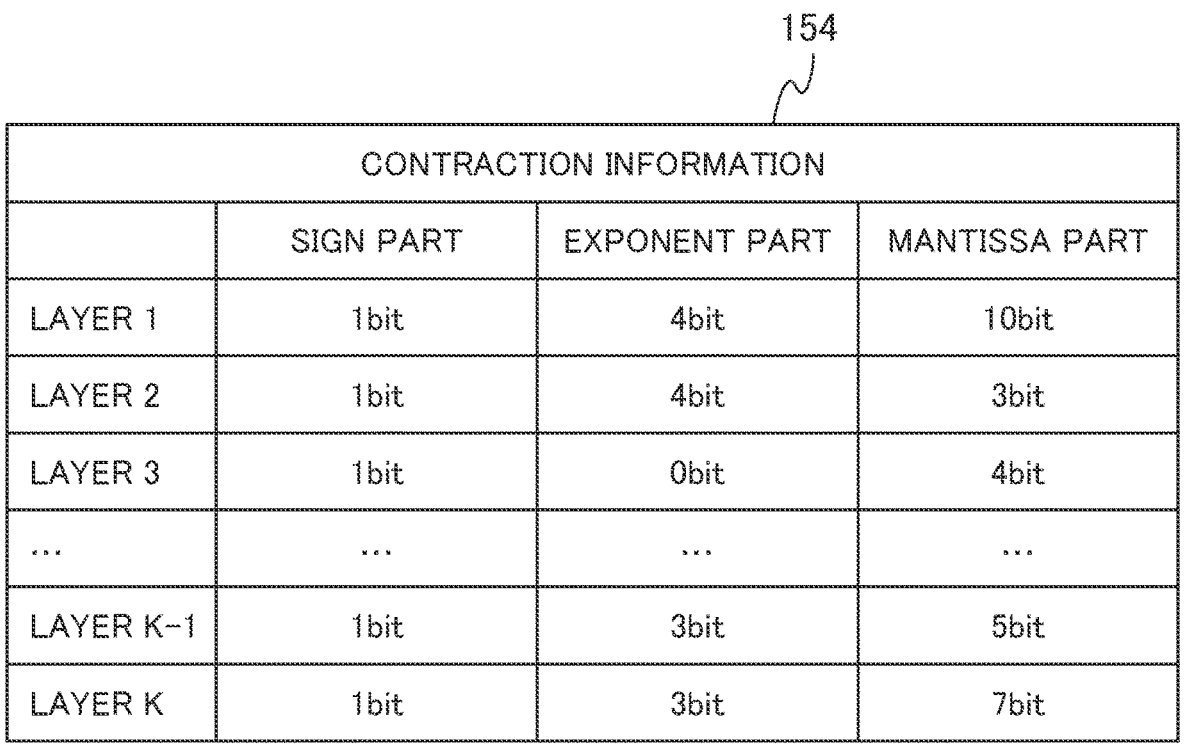
FIG. 7 is a chart showing an example of contraction information 154.

Now referring to FIG. 6 and FIG. 7, description is made on a computing system S according to a second embodiment of the invention. In the following description, equal or similar reference numerals to those of the first embodiment are assigned to equal or similar components so as to focus mainly on differences. Such components as not specifically described are the same as those of the first embodiment. This embodiment principally differs from the first embodiment in that the high-precision model 152 is previously installed in the server and the on-vehicle device.

FIG. 6 is a set of functional configuration diagrams of a server 1A and an ECU 2A according to the second embodiment hereof. The server 1A has a functional configuration where the model creation part 121 is removed from the functional configuration of the server 1 according to the first embodiment and the simplification part 122 is replaced by a simplification part 122A. The server storage part 15 according to the second embodiment contains the learning image 151, the high-precision model 152, the contraction information 154, and the threshold value table 155. The learning image 151, the high-precision model 152 and the threshold value table 155 are previously stored in the server storage part 15. The contraction information 154 is generated by the simplification part 122A.

The simplification part 122A generates the contraction information 154 instead of creating the low-precision model 153. Specifically, the simplification part 122A stores, in the server storage part 15, the parameters determined for the creation of the low-precision model 153 in the first embodiment, namely the calculation precisions for the individual layers of the learned model as the contraction information 154. If the operations of the simplification part 122A are shown in a flow chart, the operation of S607 in FIG. 4 is replaced by the generation of the contraction information 154. The contraction information 154 is transmitted to the ECU 2A by the server communication part 16.

FIG. 7 is a chart showing an example of the contraction information 154. As described above, the learned model is composed of multiple layers. The model creation part 121 determines the precision on a per-layer basis. As shown in FIG. 7, therefore, the contraction information 154 is a list of digit numbers or bit numbers of the sign part, the exponent part and the mantissa part of each layer. Returning to FIG. 6, further description is made.

The functional configuration of the ECU 2A is such that the rewrite part 211 of the functional configuration of the ECU 2 according to the first embodiment is replaced by a rewrite part 211A. The on-vehicle storage part 25 of the ECU 2A contains: the structure information 251, the high-precision model 152 and the contraction information 154. The structure information 251 is generated by the rewrite part 211A. The high-precision model 152 is previously stored in the on-vehicle storage part 25. It is noted, however, that the high-precision model 152 may also be received via the server 1A. The contraction information 154 is received from the server 1A.

The rewrite part 211A creates the low-precision model 153 by using the contraction information 154 received from the server 1A and the previously stored high-precision model 152. Then, the rewrite part 211A generates the structure information 251 just as in the first embodiment. That is, the rewrite part 211A according to the second embodiment is equipped with a part of the function of the simplification part 122 of the first embodiment, specifically, a processing function of S607 shown in FIG. 4.

Comparison with First Embodiment

According to the second embodiment, the information on the precision of the calculation by the inference part 221 exists as the contraction information 154. The ECU 2 creates the low-precision model 153 by using the contraction information 154 and the high-precision model 152. According to the first embodiment, on the other hand, the information on the precision of the calculation by the inference part 221 does not exist as an independent entity but is included in the low-precision model 153 created by the server 1. In other words, the low-precision model 153 of the first embodiment integrates the contraction information 154 and the high-precision model 152. The simplification part 122 of the first embodiment can be said to generate the contraction information 154 in the process of creating the low-precision model 153.

According to the above-described second embodiment, the following working effects are obtained.

(1) The computing system S includes the server 1A and the ECU 2A mounted on the vehicle 3. The server 1A includes: the server storage part 15 containing the high-precision model 152; the simplification part 122 which generates the contraction information for determination of the calculation precision by using the high-precision model 152 and the learning image 151; and the server communication part 16 for transmitting the contraction information 154 to the ECU 2A. The ECU 2A includes: the signal input part 28 to which the shot image taken by the camera 4 mounted on the vehicle 3 is inputted; the on-vehicle communication part 26 for receiving the contraction information 154; the inference part 221 for making an inference on the shot image; the reconfigurable FPGA 22; and the rewrite part 211A and the reconfiguration part 222 which configure the inference part 221 in the FPGA 22 based on the contraction information 154. Since the ECU 2A creates the inference part 221 in the FPGA 22 based on the contraction information 154, the occupation area of the logic circuit can be reduced without significantly decreasing the calculation precision. The server 1A transmits the contraction information 154 but not the learned model per se and hence, communication volume can be reduced.

(2) The simplification part 122 makes a calculation with a reference precision and a calculation with a precision lower than the reference precision by using the high-precision model 152 and the learning image 151, so as to define the lowest precision as the contraction information 154, that provides a difference equal to or less than a predetermined value, the difference between a result of the calculation with the reference precision and a result of the calculation with the precision lower than the reference precision.

Therefore, the inference part 221 created based on the contraction information 154 has low calculation precision but the calculation precision lowers only to a permitted limit listed in the threshold value table 155. That is to say, the inference part 221 can ensure the required precision while achieving the reduction of the occupation area of the FPGA 22.

(3) The high-precision model 152 and the low-precision model 153 are each composed of multiple layers. The contraction information 154 defines the calculation precision for each of the multiple layers. Therefore, the inference part 221 can ensure the calculation precision for each of the multiple layers.

(4) The contraction information 154 includes the digit number of the mantissa part of the floating-point type and the digit number of the exponent part of the floating-point type.

First Modification of Second Embodiment

The ECU 2A may change the calculation precision according to conditions. In this exemplary modification, the on-vehicle storage part 25 further contains a conditions table 252. From the shot images taken by the camera 4 and the like, the rewrite part 211A determines to which of the conditions listed in the conditions table 252 do correspond the conditions of the vehicle 3 or conditions around the vehicle 3. The rewrite part 211A directs the reconfiguration part 222 to configure the inference part 221 in the FPGA 22 with a precision corresponding to the conditions in question. In a case where the rewrite part 211A determines that the conditions of the vehicle 3 or conditions around the vehicle 3 do not correspond to any of the conditions listed in the conditions table 252, the rewrite part configures the inference part 221 by using the contraction information 154.

FIG. 8 is a chart showing an example of the conditions table 252. The conditions including "high-speed running", "wet weather" and "stopped" are recorded on the conditions table 252. "High-speed running" is selected when the rewrite part 211A determines that the vehicle 3 is running at high speeds. "Wet weather" is selected when the rewrite part 211A determines that the rain is falling around the vehicle 3. "Stopped" is selected when the rewrite part 211A determines that the vehicle 3 is stopped. Recorded in the conditions table 252 are the precisions of the inference part 221 which correspond to the individual conditions, namely the bit number of the exponent part and the bit number of the mantissa part. It is noted that the conditions table 252 may also include the sign part.

Second Modification of Second Embodiment

In the above-described first embodiment, the parameters included in the high-precision model 152 and the low-precision model 153 are represented by the floating-point type. However, these parameters may also be represented by the integer type. In this case, as well, the inference part 221 performs the calculation on the basis of the floating-point type and hence, the model creation part 121 transmits the precision of the calculation to the ECU 2 as the contraction information 154. The following is a detailed explanation. It is noted that on assumption that the parameters of the individual layers of the high-precision model 152 have been calculated on the basis of the integer type, the description is principally made on differences from the first embodiment out of the operations from S602 onward in FIG. 4.

In S602, the simplification part 122 performs calculations of individual layers by converting the parameters of the individual layers of the high-precision model 152 and the pixel values of the learning image 151 to 32-bit floating-point type, and temporarily stores the calculation results as reference values. In S604, the simplification part 122 performs the processing the same way as in the first embodiment by changing the bit number of the floating-point type to be converted. A processing of S605 is the same as that of the first embodiment. According to the second modification, the invention can be applied to a variety of learning models.

Each of the above-described embodiments and modifications can be combined with each other. While the above description provides explanation about a variety of embodiments and modifications, the invention is not limited to the details of these. Other modes conceivable within the scope of technical idea of the invention are also included in the scope of the invention.

The content of the disclosure of the following priority application upon which this patent application is based is hereby incorporated by reference.

Japanese Patent Application Laid-Open No. 2017-238805 (filed Dec. 13, 2017).

REFERENCE SIGNS LIST

1: server
2: on-vehicle device
15: server storage part
16: server communication part
25: on-vehicle storage part
28: signal input part
121: model creation part
122: simplification part
152: high-precision model
153: low-precision model
154: contraction information
155: threshold value table
221: inference part
222: reconfiguration part
251: structure information
252: conditions table
253: threshold value table

The invention claimed is:

1. A computing system comprising a server and an on-vehicle device mounted on a vehicle, wherein
the server includes:
a server storage containing a learned model;
a first processor which generates a contraction information for determination of calculation precision by using the learned model and an object of inference; and
a server communication circuitry for transmitting the contraction information to the on-vehicle device, and
the on-vehicle device includes:
a signal input to which an output signal from a sensor mounted on the vehicle is inputted;
an on-vehicle communication circuitry for receiving the contraction information;
an inference logic circuit for making an inference on the output signal;
a reconfigurable logic circuit; and
a reconfiguration circuitry for configuring the inference logic circuit based on the contraction information.

2. The computing system according to claim 1, wherein the on-vehicle device further includes an on-vehicle storage containing the learned model, and
the reconfiguration circuitry configures the inference logic circuit based on the learned model and the contraction information.

3. The computing system according to claim 1, wherein the first processor creates a low-precision model integrating the contraction information and the learned model,
the server communication circuitry transmits the low-precision model to the on-vehicle device, and
the reconfiguration circuitry configures the inference logic circuit by using the received low-precision model.

4. The computing system according to claim 1, wherein the learned model comprises linear components alone.

5. The computing system according to claim 1, wherein the learned model comprises multiple layers, and
the contraction information determines a precision of calculation for each of the multiple layers.

6. The computing system according to claim 1, wherein the first processor makes calculations with a reference precision and with a precision lower than the reference precision by using the learned model and the object of inference so as to define, as the contraction information, the lowest precision that provides a difference equal to or less than a predetermined value between a result of the calculation with the reference precision and a result of the calculation with the precision lower than the reference precision.

7. The computing system according to claim 1, wherein the contraction information is digit numbers of a mantissa part and an exponent part of a floating-point type.

8. An on-vehicle device mounted on a vehicle comprising:
a signal input to which an output signal from a sensor mounted on the vehicle is inputted;
an on-vehicle communication circuitry for receiving a contraction information for determination of calculation precision;
an inference logic circuit for making an inference on the output signal;
a reconfigurable logic circuit; and
a reconfiguration circuitry for configuring the inference logic circuit based on the contraction information.

* * * * *